June 22, 1926.
G. GRIFFITH
PHOTOGRAPHIC AND PROJECTING INSTRUMENT
Filed March 22, 1924    3 Sheets-Sheet 1
1,589,754
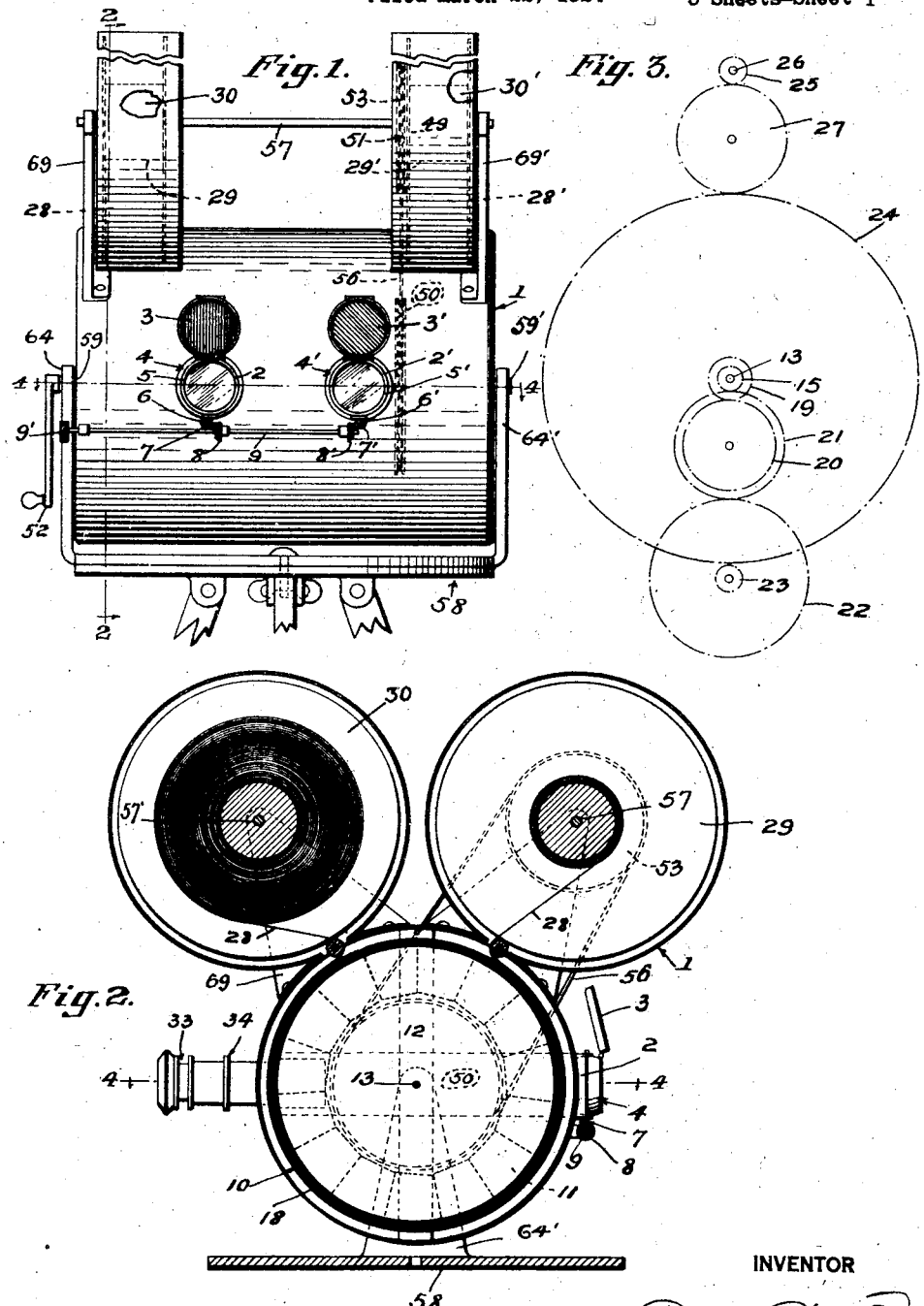
INVENTOR June 22, 1926.
G. GRIFFITH
1,589,754
PHOTOGRAPHIC AND PROJECTING INSTRUMENT
Filed March 22, 1924     3 Sheets-Sheet 2
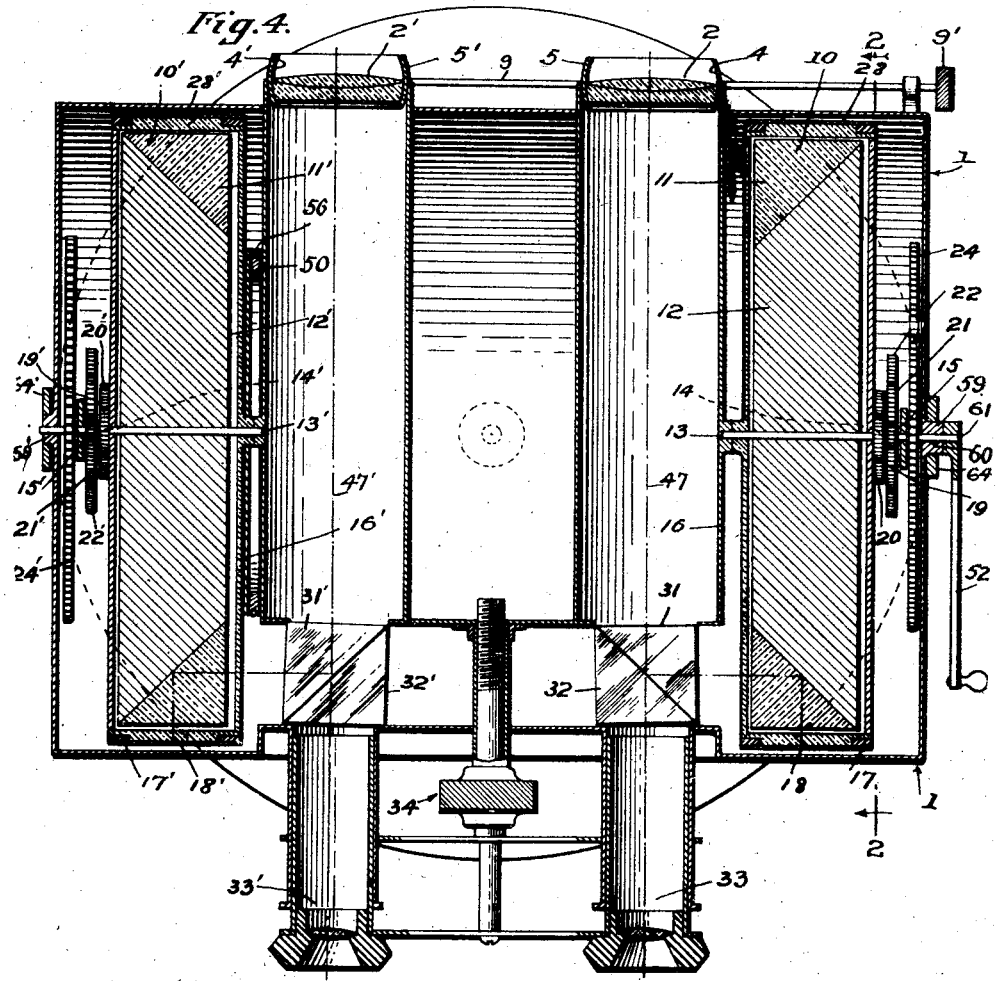
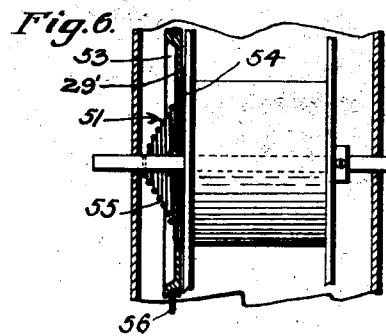
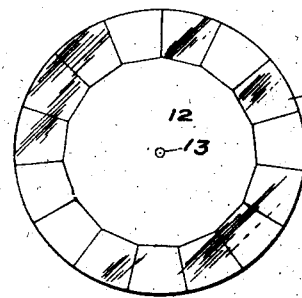
INVENTOR

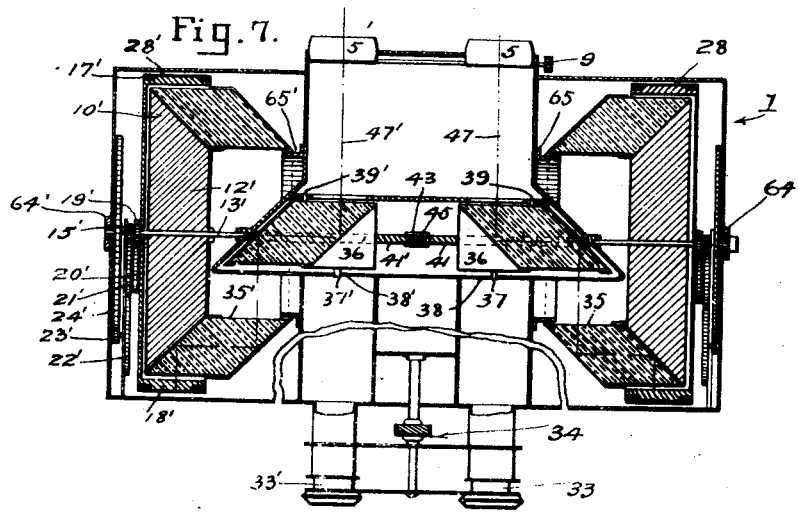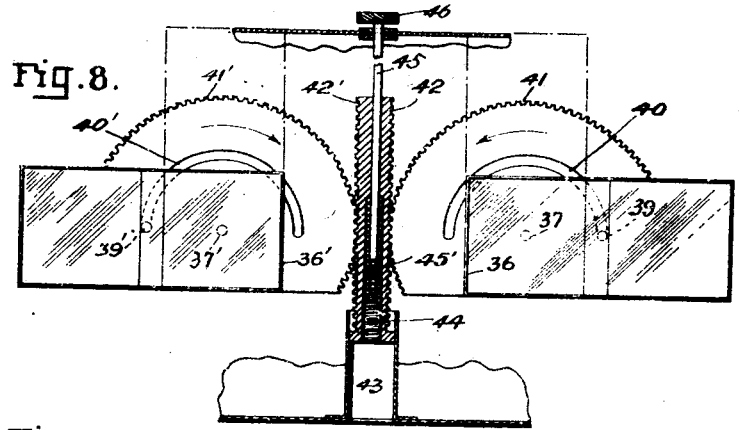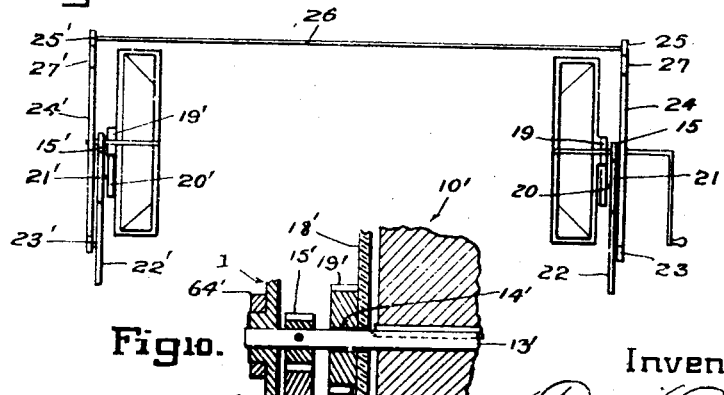

Patented June 22, 1926.

1,589,754

UNITED STATES PATENT OFFICE.

GRAVES GRIFFITH, OF SAN FRANCISCO, CALIFORNIA.

PHOTOGRAPHIC AND PROJECTING INSTRUMENT.

Application filed March 22, 1924. Serial No. 701,050.

The present invention relates to improvements in that particular type of optical instruments operating to expose consecutive sections of companion films while in motion to the action of filtered beams of light as reflected by rotating reflective elements, and has for principal objects the provision of means for the production of simultaneously taken pictures from spaced view points upon spaced films while in motion by means of a ray of different color being directed respectively thereupon, and the projection of the positives of pictures thus secured by a simple reversal of the process whereby they were secured.

An additional object, and of an importance equaling the preceding and dependent thereupon for its attainment, is the utilization of means in connection therewith for the creation of stereoscopic effects in the pictures thus projected comprised of color screens for the eyes matching those made use of in the photographic and projective processes.

In the production of pictures and their projection, in the manner prescribed and with the objects in view specified, it is an obvious requirement that, considering that beams of light reflected by rotating reflective elements have a circular sweep and are given an angular velocity of movement double that of the rotating elements reflecting them, compensating means be provided giving to the film sections undergoing exposures the same directional movement and angular velocity as those possessed by the rotating beams of light; and that, in order that stereoscopic effects may result from the projected pictures, control of the light as to color must be resorted to, in the taking, projecting and viewing of the pictures, that will prevent an eye seeing any pictures other than those resulting from a ray color identical with that of the eye-screen through which they are being viewed.

Illustrative of this, and assuming that the ray color selected for the respective films, and also the color for the respective eye-screens, to have been the red and the green, then only those pictures resulting from the red rays will be seen through the red eye-screen, and only those pictures resulting from the green rays will be seen through the green eye-screen, with a consequent relationship of pictures as thus viewed analogous to that of the usual stereoscopic pictures and, like them, dependent upon the proper blending of the two pictures into one for the creation of the impression of relief.

The invention comprises a pair of matched and spaced objectives provided with a mechanism for imparting to them partial rotation about vertical axes in opposed directions; a pair of ray-filters differing in color and so disposed as to permit of being brought into or out of active association respectively with the spaced objectives; a pair of spaced, similar and revoluble reflective combination, constituted respectively of a plurality of reflective units contiguously and annularly disposed and in co-operative association at regular intervals with the spaced objectives through the medium of light-dividing reflective combinations adapted to reflect a portion of the light received thereby and to transmit another portion directly therethrough; a pair of transparent cylindrical film-drums arranged respectively to encompass the revoluble reflective combinations and to be revolved at double the velocity thereof, and adapted to feed respectively through an arcuate exposure area a film provided with a dispensing and a receiving reel; a pair of similar gear-trains, common to and actuating both reflective members and transparent film-drums; and a binocular optical system for view-finding and adjustment of image-fields relative to each other and said films, comprised of said objectives, said combination light-reflecting and light-transmitting elements and the usual binocular ocular element.

In the preferred embodiment of my invention, as presented in Figures 1, 2, 3, 4 and 5, the revoluble reflective members are comprised respectively of annularly arranged reflective units of the isosceles right-angled prism type, while the reflective media here employed through which co-operative association of these units with the objectives is assured as well as affording co-operative association between objectives and the ocular system, comprise light-dividing combinations consisting respectively of a pair of these right-angled prisms with juxtaposed hypothenusal surfaces separated by an air-film, the reflected portion of the light directed thereto by the objectives being reflected to the revoluble reflective units, and therefrom to the films, while the other portion is permitted to pass directly therethrough to the oculars. As is indicated in Fig. 4 the prisms are slightly inclined from the axial line of the instrument, the angle of inclination being such that one-half of the light impinging thereon is reflected and one-half is transmitted.

In the modification, as presented in Figures 7 and 8, the rhomboidal type of prism has been substituted, throughout, for that of the isosceles right-angled type, necessitating no other structural changes from that of the preferred embodiment than the incorporation of a mechanism adapted to turn through a quadrant movement and about their horizontal transverse axes the two prisms normally operating as reflective media through which co-operative association of objectives and revoluble reflective units is assured, when desired to bring them into a position of co-operative association with the ocular system.

The instrument being a combination of two similar, equal and distinct entities operating simultaneously, it is obvious that a description of the one is equally applicable to that of the other.

In the accompanying drawings, forming a part of this specification, similar reference characters designate like parts in the one entity, and these characters primed designate the duplication of these parts constituting the other entity.

Figure 1 is a front elevational view of a preferred embodiment of my invention, showing the housing including the reels, the position of the spaced objectives, the means for their partial rotation about vertical axes, and the color screens thrown clear of the objectives.

Figure 2 is a vertical section on line 2—2 of Figure 1, showing annular arrangement of a revoluble reflective system comprised of a series of reflective units, a transparent film drum, a dispensing and a receiving reel, an objective, an ocular, and a film.

Figure 3 is a diagrammatic view of a gear-train operating to rotate a revoluble reflective system and also a transparent film drum. Figure 4 is a horizontal sectional view on line 4—4 of Figure 2, showing spaced objectives, spaced light-dividing prism in respective co-operation therewith, the oculars in respective reception of the directly transmitted light-rays, the revoluble annularly arranged reflective members, the transparent film drums, the films, the driving mechanisms for the revoluble reflective members, and the means for focussing the oculars.

Figure 5 is an end elevation showing the annular arrangement of the reflective elements.

Figure 6 is a frictional drive carried by the shaft bearing the receiving reels whereby the reels may be actuated in taking up the slack in the films, as paid out.

Figure 7 is a horizontal sectional view of a modification, similar to that presented in Figure 1, but showing the substituted rhomboidal prisms.

Figure 8 is a detail of a mechanism for bringing into and out of co-operative association the two rhomboidal prisms with the revoluble annularly arranged reflective members and conversely with the ocular system.

Figure 9 is a diagrammatic plan of the driving mechanism operating the duplicated revoluble elements.

Figure 10 is an enlarged detail of the shaft 13 bearing an annularly arranged series of reflective elements keyed thereto, a pinion secured thereto, and revolubly supporting a sleeve to which are secured a pinion and a cylindrical transparent film drum.

Referring more particularly to the drawings and having in mind the dual character of the instrument, 1 indicates the casing including the housings for the reels; 2, 2' the objectives, 3 and 3' the ray-filters, 4, 4' the cylindrical segmental mountings rotatably borne in members 5 and 5' of similar form and curvature; a means comprising shafts 6 and 6' bearing respectively bevel-gears 7 and 7' meshing respectively with bevel-gears 8 and 8' borne by shaft 9 carrying knurled knob 9' whereby partial rotation is secured in opposed directions about vertical axes for the objectives; 10, 10' revoluble reflective members comprised respectively of annularly and contiguously disposed reflective units 11 and 11' and borne respectively by elements 12 and 12' secured to shafts 13 and 13' bearing respectively gears 15 and 15'; 16, 16' transparent film-feeding drums provided with friction elements 17 and 17' and borne respectively by members 18 and 18' secured to sleeves 14 and 14' bearing gears 19 and 19' and supported by shafts 13 and 13'; gear-trains 20, 21, 22, 23, 24, 27, and 20', 21', 22', 23', 24', 27', in operative association respectively with the gears 15 and 15', and 19 and 19'; dispensing reels 29 and 29'; spaced films 28 and 28'; receiving reels 30 and 30'; film take-up means 51 comprising a pulley 50 axially borne by 16', a pulley 53 loosely borne on shaft 57 bearing the reels 30 and 30' and provided with a friction surface 54 contacting with a reel surface, as 29', and held to contact by a spring 55, and an elastic-band element 56 connecting pulley 50 with pulley 53; a means 58 for mounting the instrument similar to that employed in mounting telescopes in transits and theodolites but with a trunnion, as 59, carrying a bore 60 through which projects the shaft 61 of the master gear 24 and to which is attached an actuating means 52; light-dividing prism combinations 31, 32 and 31', 32' having juxtaposed hypothenusal surfaces separated by air-films, and adapted to reflect portions of the light directed thereupon to consecutive units comprising the revoluble reflective combination and from thence to the films, and to transmit directly therethrough the remaining portion to an ocular system 33, 33'; and a means 34 for focussing the ocular system.

In the modification as presented in Figures 7 and 8, the arrangement of the rhomboidal prism units 35 and 35' is annular and contiguous, as with the isosceles right-angled one previously described, but with the difference that while, with the isosceles right-angled type, the light-rays undergo but two reflections, with the rhomboidal type they undergo four, a difference of minor importance and without sacrifice of principle. Where the rhomboidal type of prisms have been employed in the revoluble reflective members' make-up, there is necessitated the employment of like prisms as mediums of co-operative association between objectives and the individual reflective units constituting the revoluble reflective members, with the added provision of means for changing these from the horizontal, or normal, position to the vertical, when it is desired to bring them into co-operative association with the ocular system for purpose of adjusting image-fields relative to each other and returning them thereafter to normal position, for directing light rays transmitted by objectives to the revoluble reflective units and therethrough upon the films, these means comprising mountings 36 and 36' supported respectively by shafts 37 and 37' in bearings 38 and 38', with opposite sides provided with studs 39 and 39' adapted to traverse the arc-shaped guides 40 and 40' and carrying respectively toothed arcs 41 and 41' in engagement respectively with respective sides of the double rack 42 and 42' slidably borne in the guide 43 and provided with a threaded bore 44 having therein a member 45 bearing on its lower extremity threads 45' engaging the threads of the bore 44 and provided at its upper extremity with a knurled knob 46 as an actuating means, 47 and 47' incident rays on their respective courses to their films, 64 and 64' yoke supporting the trunnions 59 and 59', 65 and 65' annular bearings supporting the overhang of the rhomboidal prism series, and 69 and 69' braces supporting the reel-casings forming a part of the general housing.

As may be observed, the prisms 36 and 36' when brought into vertical position require that the oculars occupy a higher plane.

Having thus described my invention, I claim, and desire to secure by Letters Patent:

1. In an instrument of the character described, an objective, a revoluble annularly arranged series of similar reflective units, a reflective element so disposed as to receive beams of light as directed by said objective and reflect them to successive reflective units of said revoluble reflective series, a film, a transparent film-feeding drum encircling said series of reflective units, and means for imparting an equal angular velocity, in a common direction and about a common axis of rotation, to said film and to said beams of light as reflected by said annularly arranged series of reflective units.

2. In an instrument of the character described, spaced objectives, means for the partial rotation of said objectives in opposed directions about their vertical axes, ray filters adapted to screen said objectives, spaced revoluble reflective members, spaced transparent revoluble film-feeding drums respectively encircling said revoluble reflective members and revoluble thereabout in a common direction and at double the angular velocity thereof, and means adapted to actuate said revoluble reflective members and said transparent film-feeding drums.

3. In an instrument of the character described, spaced objectives, means for the partial rotation of said objectives in opposed directions about their vertical axes, ray-filters adapted to screen said objectives, spaced revoluble reflective members, revoluble transparent film-feeding drums concentrically disposed respectively relative to said revoluble reflective members, revoluble therewith and thereabout and at double the angular velocity thereof, spaced films arranged to be fed by said transparent drums through arcuate exposure areas, similar and spaced mechanisms for the respective actuation of said revoluble reflective members and said revoluble transparent film-feeding drums, and a means for the simultaneous actuation of both of said mechanisms.

4. In an instrument of the character described, spaced objectives, means for the partial rotation of said objectives in opposed directions and about their vertical axes, spaced and similar revoluble reflective members, similar and revoluble transparent film-feeding drums concentric and revoluble respectively therewith about common axes of rotation, but, with an angular velocity double that of said reflective members, spaced films carried respectively by said transparent drums, spaced and similar mechanisms for the respective actuation of said revoluble reflective members and said transparent drums, a means wherethrough both of said similar mechanisms may be driven, a binocular system, and spaced and similar light-dividing means arranged to receive and divide the beams of light as directed respectively thereto by said objectives, transmitting a portion of said divided beams of light to successive reflective units of said revoluble reflective members, and a portion to said binocular system.

5. In an instrument of the character described, spaced objectives, ray-filters in respective association therewith, spaced revoluble reflective members comprised respectively of similar annularly and contiguously arranged reflective units, a binocular system, spaced light-dividing elements so disposed respectively as to receive the light beams as directed by the respective objectives, reflecting a portion to successive reflective units of said revoluble reflective members and transmitting a portion to said binocular system, spaced transparent film-feeding drums enclosing respectively said revoluble reflective members and revoluble therewith about their axes of rotation, spaced films in respective association with said transparent revoluble drums and arranged to be fed thereby, spaced and similar mechanisms adapted to give simultaneously to said revoluble reflective members and to said transparent drums common directional movements about common axes but to said drums an angular velocity double that of the said reflective members, and a means operating to drive simultaneously both of said mechanisms.

6. In an instrument of the character described, duplicate shafts in co-axial alignment; duplicate gears and duplicate supporting members for reflective elements borne respectively by said shafts; duplicate reflective members borne respectively by said supporting members, said reflective members being comprised respectively of a series of annularly and contiguously disposed reflective units; duplicate pairs of sleeves borne respectively by said shafts; duplicate gears borne respectively by a sleeve of each of said pairs; supporting members borne respectively by said sleeves; duplicate transparent drums concentrically arranged respective to said last mentioned members; duplicate films arranged to be fed respectively by said drums; duplicate gear-trains in operative association respectively with both the gears borne by said shafts and the gears borne by said sleeves; and a means for the simultaneous actuation of both said gear-trains and therethrough said reflective members and said drums, giving to both drums and reflective members the same directional movements, but to the said drums an angular velocity double that of the reflective members.

7. In an instrument of the character described, an optical system for view-finding and image-field adjusting, comprising spaced objectives having their optical axes lying in a common plane and in parallelism, spaced oculars having their optical axes in parallelism and lying in a plane paralleling the aforesaid plane, spaced rhomboidal prism elements rotatively disposed and operatively arranged for movement respectively into or out of position for receiving beams of light as directed respectively by said objectives and reflecting them to said oculars, means for focussing said oculars, and means for imparting to said rhomboidal prism elements the necessary degree of rotative movement to insure their being brought into or out of co-operative position relative to said objectives and said oculars.

8. In an instrument of the character described, an objective system comprised of spaced objectives, mounts respectively for said objectives of substantially ball-and-socket character and adapted to permit to said objectives movements about vertical axes in opposed directions, shafts borne centrally by the ball section respectively of said mounts and bearing respectively a gear, a shaft bearing gears in respective mesh with the gears borne by said shafts, and a means borne by said shaft whereby it may be actuated.

9. In an instrument of the character described, an objective, a revoluble reflective member comprised of a series of annularly and contiguously arranged reflective prism units, means whereby said series of reflective prism units are secured to and borne by a shaft, a gear borne by said shaft, a transparent cylindrical film-feeding element concentric to said series of reflective prism units, revoluble therewith and thereabout but at double the angular speed thereof, means whereby the said film-feeding element is secured to sleeves borne by said shaft and supporting said last mentioned means, a gear borne by one of said sleeves, a gear-train in association with both the said gears borne respectively by said shaft and said sleeve and adapted to revolve said film-feeding element at double the angular velocity of said series of reflective prism units, a reflective element so disposed as to receive the beams of light as directed by said objective and direct them to a point at which they may be received successively by the rotating prism units comprising said series, a film arranged to be fed by said film-feeding element and for the reception, while in motion, of the rotating beams of light as directed thereto by successive reflective prism units of the series constituting said revoluble reflective member.

10. In an instrument of the character described, revoluble reflective members comprised respectively of a series of rhomboidal prism units annularly and contiguously disposed about members borne respectively by shafts in co-axial alignment and bearing respectively a gear, revoluble transparent cylindrical bodies concentrically arranged respective to said annularly and contiguously disposed prism units, and secured respectively to means carried by a pair of sleeves borne respectively by said shafts, a sleeve of each of said pairs being provided with a gear, duplicate gear-trains adapted for the simultaneous actuation of said reflective members and said transparent cylindrical bodies through their respective connections with the said gears borne by said shafts and the said gears borne by said sleeves, duplicate films arranged to be fed respectively by said cylindrical bodies, duplicate and spaced objectives arranged for partial rotation about vertical axes, means for imparting said partial rotation in opposed directions to said objectives about said vertical axes, ray-filters adapted for screening said objectives, a binocular system, means for focussing said binocular system, means comprising rhomboidal reflective elements so disposed and borne, respectively, as to receive the beams of light as transmitted by said objectives, and to direct them to either successive units of the rhomboidal prism series or to the binocular system, as may be desired, and means adapted to turn said rhomboidal reflective elements about the horizontal axis in such degree as to cause said transmitted beams of light to be received and directed in either one or the other of said two directions.

11. In an instrument of the class described, a reflecting member comprising a plurality of contiguously arranged rhomboidal units, each of said units having parallel entrant and emergent faces, two parallel reflective faces, and plane upper and lower faces, said plane faces being equally inclined to the emergent face, and means for rotating said units, said units being disposed about said means to form an annular zone presenting the emergent faces as a combination of peripheral rectangular surfaces.

12. In an instrument of the class described, a reflecting member comprising a plurality of contiguously arranged rhomboidal units, each of said units having parallel entrant and emergent faces, two parallel reflective faces and plane upper and lower faces, said plane faces being equally inclined to the emergent face, and means for rotating said units, said units being disposed about said means to form an annular zone presenting the emergent faces as a combination of peripheral rectangular surfaces, and a fixed reflective element adapted to direct rays of light successively upon the entrant faces of said units.

GRAVES GRIFFITH.